(12) United States Patent
Liu et al.

(10) Patent No.: US 8,064,527 B2
(45) Date of Patent: Nov. 22, 2011

(54) ERROR CONCEALMENT IN A VIDEO DECODER

(75) Inventors: Yipeng Liu, Sunnyvale, CA (US);
Edmund Thompson, Burlington, MA (US)

(73) Assignee: Polycom, Inc., Pleasanton, CA (US)

( * ) Notice: Subject to any disclaimer, the term of this patent is extended or adjusted under 35 U.S.C. 154(b) by 1860 days.

(21) Appl. No.: 11/208,153

(22) Filed: Aug. 19, 2005

(65) Prior Publication Data
US 2006/0039475 A1 Feb. 23, 2006

Related U.S. Application Data

(60) Provisional application No. 60/603,112, filed on Aug. 20, 2004.

(51) Int. Cl.
*H04N 7/12* (2006.01)
*H04N 11/02* (2006.01)
*H04N 11/04* (2006.01)

(52) U.S. Cl. ............... 375/240.27; 348/425.2

(58) Field of Classification Search ............. 375/240.27
See application file for complete search history.

(56) References Cited

U.S. PATENT DOCUMENTS

| | | | | |
|---|---|---|---|---|
| 5,854,799 | A | 12/1998 | Okada et al. | 371/37.1 |
| 5,959,672 | A | 9/1999 | Sasaki | |
| 6,489,996 | B1 | 12/2002 | Matsumura et al. | 348/416 |
| 6,611,561 | B1 * | 8/2003 | Hannuksela et al. | 375/240.27 |
| 6,704,363 | B1 * | 3/2004 | Kim | 375/240.27 |
| 6,778,610 | B2 * | 8/2004 | Lin | 375/240.27 |
| 6,842,219 | B2 * | 1/2005 | Lee | 352/244 |

FOREIGN PATENT DOCUMENTS

| | | |
|---|---|---|
| EP | 0 818 931 A2 | 1/1998 |
| EP | 0 866 623 A2 | 9/1998 |
| JP | 09247681 | 9/1997 |
| WO | WO 03/019939 | 3/2003 |

OTHER PUBLICATIONS

Search Report for corresponding European patent application No. 05018039.7-2223 dated Dec. 21, 2005.
Japanese Office Action dated Jan. 23, 2009 for Japanese Patent Application 2005-235946 with English Translations.
Search Report received in corresponding European Application No. EP 05 01 8039 dated Oct. 6, 2006.
Cheng, et al.; "Wireless Intelligent ATM Network and Protocol Design for Future Personal Communication Systems;" IEEE Journal on Selected Areas in Communications, vol. 15, No. 7, Sep. 1997; pp. 1289-1307.

(Continued)

*Primary Examiner* — Mehrdad Dastouri
*Assistant Examiner* — Jeremaiah Hallenbeck-Huber
(74) *Attorney, Agent, or Firm* — Wong, Cabello, Lutsch, Rutherford & Brucculeri, L.L.P.

(57) ABSTRACT

The error concealment technique disclosed herein relates to the use of existing information by the decoder to conceal bitstream errors regardless of what the encoder does. Examples of existing information include, for example, the previous reference frame, macroblock information for the previous reference frames, etc. Another aspect of the system described herein relates to the steps that the encoder can take to enhance the decoder's ability to recover gracefully from a transmission error. Exemplary steps that can be taken by the encoder include intra walk around and sending GOB headers. Although these encoder techniques can provide greatly enhanced results, they are not strictly necessary to the system described herein.

7 Claims, 1 Drawing Sheet

| 0 >62x | 1 | 0 22x | 1 | 0 | 1 | 1 | 1 | 0 10x | 1 | All remaining bits are 1s |
|---|---|---|---|---|---|---|---|---|---|---|

| 0 16x | 1 | 0 | 0 | 1 | 1 | 0 5x | 1 |
|---|---|---|---|---|---|---|---|

OTHER PUBLICATIONS

Liu, et al.; "Combining Adaptive Modulation and Coding with Truncated ARQ Enhances Throughput;" 2003 4th IEEE Workshop on Signal Processing Advances in Wireless Communications; pp. 110-114.

Fitzek, et al.; "Comparison of Multi-Code Link-Layer Transmission Strategies in 3Gwireless CDMA;" Technologies on Broadband Wireless Mobile—3Gwireless and Beyond; IEEE Communications Magazine; Oct. 2000; pp. 58-64.

* cited by examiner

| 0 >62x | 1 | 0 22x | 1 | 0 | 1 | 1 | 1 | 0 10x | 1 | All remaining bits are 1s |

Fig. 1

| 0 16x | 1 | 0 | 0 | 1 | 1 | 0 5x | 1 |

Fig. 2

| 0 17x | 1 | 0 | 0 | 1 | 1 | 0 10x | 1 |

Fig. 3

ERROR CONCEALMENT IN A VIDEO DECODER

CROSS REFERENCE TO RELATED APPLICATION

This application claims priority under 35 U.S.C. §119(e) to U.S. provisional patent application Ser. No. 60/603,112, filed Aug. 20, 2004, which is incorporated herein by reference in its entirety.

BACKGROUND OF THE INVENTION

1. Field of the Invention

The present invention relates generally to video communication and more particularly to a method of detecting and concealing errors in a video bitstream.

2. Description of Related Art

Digitization of video images has become increasingly important. In addition to their use in global communication (e.g., videoconferencing), digitization of video images for digital video recording has also become increasingly common. In each of these applications, video information is transmitted across telecommunication links such as telephone lines, ISDN, DSL, and radio frequencies, or stored on various media devices such as DVDs and SVCDs. In many cases, the transmission and/or storage is susceptible to introducing errors into the video bitstream.

Efficient transmission, reception, and/or storage of video data typically requires encoding and compressing the video data. Several approaches and standards to encoding and compressing source video signals exist. Some standards are designed for a particular application, such as ITU-T Recommendations H.261, H.263, and H.264, which are used extensively in video conferencing applications. Additionally, standards promulgated by the Motion Picture Experts' Group (MPEG-2, MPEG-4) have found widespread application in consumer electronics and other applications. Each of these standards is incorporated by reference in its entirety.

In any case, a digital image is comprised of a grid of individual pixels. Typically, the whole image is not processed at one time, but is divided into blocks that are individually processed. Each block comprises a rectangular grid of a predetermined number of luminance or luma pixels (which generally specify the brightness of a pixel) and a predetermined number of chrominance or chroma pixels (which generally specify the color of a pixel). A predetermined number of blocks are combined into a macroblock, which forms the basic unit of processing in most regimes. Although some aspects of this hierarchy of processing units are discussed below, methods and techniques for block-based processing of images for processing are generally known to those skilled in the art, and thus are not repeated here in detail.

The macroblocks of image data may be encoded in a variation of one of two basic techniques. For example, "intra" coding may be used, in which the original macroblock is encoded without reference to historical data, such as a corresponding macroblock from a previous frame. Alternatively, "inter" coding may be used, in which the macroblock of image data is encoded in terms of the differences between the macroblock and a reference macroblock of data, such as a corresponding macroblock from a previous frame. Many variations on these two basic schemes are known to those skilled in the art, and thus are not discussed here in detail. It is generally desirable to select the encoding technique which requires the fewest number of bits to describe the macroblock of data. Intra coding typically requires many more bits to represent the block, and therefore inter coding is generally preferred.

Videoconferencing "calls" are typically placed using one of two technologies. Traditionally circuit switched networks (e.g., ISDN telephone lines) have been used. Typically these calls are placed according to International Telecommunications Union (ITU) Recommendation H.320, "Narrow-Band Visual Telephone Systems And Terminal Equipment." More recently, packet switched networks such as the Internet have become more widely used for videoconferencing. A variety of packet switched multimedia communication protocols exist, one example of which is ITU Recommendation H.323, "Packet-based Multimedia Communications Systems." Each of these recommendations is hereby incorporated by reference in its entirety. Although the description herein is in the context of one of these two protocols, it is noted that the invention is not limited to only these protocols.

Video calls transmitted using either technology are in many cases subject to errors in transmission. Traditionally, when the decoder detects bit stream errors, it has two options. The first option is to freeze the display and request a fast update from the transmitter. The transmitter sends an intra frame upon such a request. The receiver's display remains frozen until the intra frame is received. These seconds of frozen video compromise the user experience. The second option is to request a fast update but continue displaying the frames that had errors. Until the requested intra frame arrives, there are artifacts like bright color blocks, black blocks, or scrambled images, etc. Such artifacts are typically more disruptive to the user experience than a frozen display, so common practice in the videoconferencing arts has been to hide the errors by choosing option one, i.e., freezing the display.

However, neither of the two options recited above is desirable. Therefore, what is needed in the art is an alternative technique of concealing errors in a video transmission that is less disruptive of the user experience. The present invention is therefore generally directed to a method for concealing video errors, reducing or eliminating visual artifacts, and reducing or eliminating the impact of visual disturbance caused by an intra update frame. Although described in terms of videoconferencing systems, the concepts described herein are equally adaptable to any video coding and decoding application.

SUMMARY OF THE INVENTION

The error concealment technique disclosed herein relates to the use of existing information by the decoder to conceal bitstream errors regardless of what the encoder does. Examples of existing information include, for example, the previous reference frame, macroblock information for the previous reference frames, etc. Another aspect of the system described herein relates to the steps that the encoder can take to enhance the decoder's ability to recover gracefully from a transmission error. Exemplary steps that can be taken by the encoder include intra walk around and sending GOB headers. Although these encoder techniques can provide greatly enhanced results, they are not strictly necessary to the system described herein.

The system disclosed herein enjoys many advantages, which will become apparent upon further reference to the detailed description below. For example, the system is completely standards based, and thus is compatible with any standards compliant videoconferencing system, including existing endpoints, gateways, and multipoint control units. Additionally, the system is compliant with video encoded using any of the H.261, H.263, or H.264 standards. The system described herein is also easy to implement, especially in an H.264 decoder. Furthermore, as noted above, although it preferred to have both the encoder and decoder enhancements described herein, the decoder alone can significantly improve the user experience. Still other advantages of the system described herein include a negligible impact on coding efficiency and minimal required extra computation.

BRIEF DESCRIPTION OF THE DRAWINGS

FIG. 1 illustrates a universal error sequence for use in an H.320 video call.

FIG. 2 illustrates an error sequence for use in an H.320 video call using an H.261 codec.

FIG. 3 illustrates an error sequence for use in an H.320 video call using an H.263 codec.

DETAILED DESCRIPTION OF THE INVENTION

As noted briefly above, video bitstreams are transmitted in essentially two ways: a stream of bits on an ISDN network or packets on an IP network. Both can have errors that cause the decoder to lose synchronization. There are three important steps for successfully concealing the errors. First, the decoder must confine the impact of the error to as small a region in the picture as possible. Second, the decoder must use existing information to patch the region that has not been successfully decoded. Third, if necessary, the decoder may contact the far-end encoder to resend missing information to resynchronize the decoder with the encoder. The encoder may obviate the need for this third step by such methods as intra walk-around or relatively frequent transmission of key frames.

Once an error is detected, the decoder needs to re-synchronize to be able to continue the decoding process. There are four different points in the bitstream at which the decoder can re-synchronize. A first synchronization point is at the frame level. Using frame level synchronization, the decoder gives up on the frame currently being decoded and moves on to the next frame by searching for the Picture Start Code.

A second synchronization point is available only to H.261 and H.263 video bitstreams. Video frames encoded using H.261 or H.263 are divided into groups of blocks (GOBs). The GOB headers can be used as a synchronization point. When an error is detected, the part of the picture from the preceding GOB header to the next GOB header is lost. The rest of the picture is still intact. One issue with GOB level synchronization in H.263 video bitstreams is that the H.263 standard does not require the encoder to send the GOB headers. Although transmission of GOB headers is permitted, they are often omitted to reduce overhead and thus improve the data rate. For the GOB level synchronization to work properly with H.263, the encoder should transmit at least some GOB headers. Video encoded using H.261 always includes GOB headers, so the technique described herein works nicely with conventional systems.

A third synchronization point, macroblock level synchronization is also available only to H.261 and H.263 decoders. There is no easy way to synchronize on the macroblock level from the raw bitstream, but when the bits are received in packets, the packet header contains information about the macroblock information. However, this information in the packet header may not be reliable in practice due to the possibility that legacy systems did not supply correct information in the packet header.

A fourth synchronization point, available only in H.264 bitstreams, is Network Adaptation Layer Unit (NALU) level synchronization. In an H.264 bitstream, macroblocks are grouped together by NALUs. NALUs that belong to one frame can be sent in any order. This requires that the H.264 decoder be able to synchronize at the NALU level. As with GOBs, each lost NALU affects only part of the picture.

The most commonly used synchronization point is the start of a frame. Using no other synchronization points can result in needing to patch almost an entire frame if an error is detected near the beginning of a frame. Consequently, additional synchronization points should be used when feasible. Because macroblock level re-synchronization is considered unreliable, the best choice for H.261 and H.263 systems is GOB level re-synchronization. For H.264, NALU level synchronization is preferred.

In either case, before decoding a frame, all macroblocks are marked as "lost" macroblocks. As the frame is decoded, each successfully decoded macroblock is changed from a lost macroblock to a "good" macroblock. In this context, "macroblock" refers to a region of pixels in the decoder reference frame (which corresponds to a particular region on the display).

Because the immediate detection of errors is uncertain, when a bitstream error is detected, all macroblocks decoded since the last synchronization point are suspect and should be re-marked as lost. A technique for reducing the number of macroblocks that need to be marked as lost in such a situation is described below. Once the entire frame has been decoded, all macroblocks that remain marked as lost must be reconstructed. The following pseudo-code describes how to reconstruct these "lost" macroblocks in an inter frame.

```
N = 0;
do
{
    if (the Nth MB is lost)
    {
        set CurrentMBInfo = Nth MBInfo of the previous frame
        if ((CurrentMBInfo->MBType is INTER) &&
            (CurrentMBInfo->ReferenceFrameNum is the most recent frame))
        {
            set MotionVectors of CurrentMB =
                the MotionVectors of the Nth MB of previous frame;
            set Coefficients of CurrentMB = no coefficient;
            MotionComp (CurrentMB);
        }
        else // if the MBType is INTRA or the prediction frame is not the
    most recent
        {
            Copy MB from the previous frame;
        }
    }
} while (++N < Total Number of MBs in a Frame)
```

The operations performed by this pseudo-code can be summarized as follows. The routine steps through the macroblocks of a frame. If a macroblock is lost, the macroblock information, e.g., whether the macroblock was inter or intra coded and what the motion vectors were if inter coded, is set to the value of the corresponding macroblock from the previous frame. (A codec might also retain other information about the macroblock, but this is not required in the context of the present invention.) If the current macroblock is an inter coded macroblock and the reference frame is the most recent frame, the motion vectors of the current macroblock are set to those of the corresponding macroblock from the prior frame and the coefficients of the current macroblock are set to zero. Then the macroblock is reconstructed using the motion compensation algorithm, and the block is essentially extrapolated from the prior frame by extending the motion compensation.

Alternatively, if the current macroblock is intra coded or if the prediction frame is not the most recent frame, then the entire macroblock is copied from the corresponding macroblock in the previous frame. Thus no reconstruction is performed on intra coded frames. When a bitstream error is detected while decoding an intra frame, the decoder freezes the display and requests a fast update. The reason for this is that in the normal case, an intra frame is sent only in one of three circumstances: (1) at the beginning of a call, (2) when the source has changed, or (3) when the encoding resolution has changed. The decoder must have this intra frame to establish a valid resolution and a valid reference frame.

The reconstruction described above works fairly well on lost macroblocks, but the reference macroblocks used by the decoder are different from what the encoder used as a reference frame in encoding the block. This divergence gets worse over time. Therefore, an intra update for the reconstructed macroblocks is required. This can be achieved in two ways. In one approach, the decoder sends the encoder a full frame fast update request. This requires no changes to the typical encoder. Alternatively, the intra update for the reconstructed macroblocks may be implemented using intra walk around on the encoder. This mechanism is described below and requires some simple changes on the encoder.

Although a full frame fast update is visually disturbing, it is available on all existing encoders. To make the decoder independent of whether the encoder is able to turn on intra walk around, the following mechanism can be used to ensure that no full frame intra request is sent if the encoder is intra walk around capable and intra walk around is enabled. When a macroblock is marked as lost, a time is recorded for that macroblock. When a macroblock is updated in intra mode, the timestamp is reset. At the end of each frame, timestamps for all macroblocks are checked. If any macroblock has been marked as "lost" for more than N seconds, a full frame fast update request is sent to the far end encoder. If the encoder is implementing intra walk around, the macroblock should have been updated during the N second period, and no full frame fast update will be required.

The intra walk around speed on the encoder, if implemented, should be derived from N so that when the encoder does send the walk around, the decoder will not request fast update. N should preferably reflect the type of video stream, i.e., resolution and frame rate, being encoded. For example, high resolution, low frame rate video, such as would be used to transmit a computer presentation should have a relatively higher N value, possibly on the order of 20 seconds. Alternatively, for lower resolution, higher frame rate video, such as would be sued to transmit video of people in a videoconference, N should have a relatively higher value, preferably on the order of about 10 seconds. To ensure that not too many fast update requests are sent, a timer is started with period M seconds when the first fast update request is sent. During the timer period, no additional fast update requests are sent. M should be tuned for optimal system performance, and it is believed that a value of 10 produces optimal results.

A preferable approach is to have an intra walk around (or equivalent update process) capable encoder. Intra walk around is a process whereby the encoder picks a few macroblocks per frame to be coded as intra macroblocks. Each frame different macroblocks are selected so that over a period of time all macroblocks in the frame will be intra coded at least once. The process then repeats continually. A basic summary of the technique is as follows.

Define the period of time needed to code each macroblock of the frame as T. The number of intra coded macroblocks per frame ($N_{intra}$) is then $N_{mb}/(Fr*T)$, where $N_{mb}$ is the total number of macroblocks per frame and Fr is the nominal frame rate for a given bitrate. The frame rate can either be obtained dynamically from tuning routines, or it can be statically defined for a given bitrate. If the frame rate is calculated dynamically, it is important that the frame rate value be changed only after a full frame walk around.

As an example, the nominal frame rate for a 384 kbps CIF call is 15. (Compact intermediate format corresponds to a resolution of 352×288 luminance pixels.) The walk around period T is set to 10 seconds to match decoder expectation for the intra walk around. Then $N_{intra}=396/(15*10)=2.64$. Rounding up to the nearest integer, the number of macroblocks to be intra coded per frame is 3.

In H.264, the intra walk around macroblocks should be coded so they are independent of the reference frames. This means that they can not use any inter macroblocks as a basis for their prediction so they must be coded as constrained intra. Details of intra walk around in H.264 are described in U.S. patent application Ser. No. 10/799,829 by John Sievers entitled, "Improved Intra Block Walk Around Refresh for H.264," which is hereby incorporated by reference in its entirety.

Another encoder enhancement that will help the decoder re-synchronize is to send a few GOB headers per frame. As noted above, in H.263 systems it is not required to send GOB headers, and many encoders eliminate these bits to reduce overhead and improve the data rate. For purposes of the enhancement described herein, it is not necessary to send all of the GOB headers. On IP networks, almost all bit stream errors are due to packet loss. Therefore, only the first sync point in any packet can provide a significant benefit. To minimize the number of bits that would be skipped in any packet following a lost packet, the sync point should be as close to the beginning of the packet as possible. If more than one GOB begins in any one packet, the best place for a GOB header is at the beginning of the first of these GOBs. It is not required that the packet boundaries correspond to the GOB boundaries.

As noted above, immediate detection of bitstream errors is not always possible, so when an error is detected, it is generally desirable to assume that all macroblocks received since the prior synchronization point are lost. Going back to the previous synchronization point is the only way to be sure that no "bad" macroblocks are displayed without proper concealment. Although this approach is safe, it is not particularly efficient because some good macroblocks may be marked as lost. If the decoder can detect the error immediately where it occurs, then all the decoded macroblocks can be considered good. Thus, the decoder will not have to trace back to the previous synchronization point, and the impact caused by a bitstream error will be more confined. (For H.261 and H.263, the synchronization points are the GOB headers. For H.264, the synchronization points are NALU boundaries.)

In an H.320 call, the H.261/H.263 bits are sent as 512-bit frames. Each frame consists of a synchronization bit, a flag indicating whether the frame is fill or real data, 492 payload bits, and an 18-bit code used for error detection and correction. Using the 18-bit code at the end, an error often can be detected and sometimes even corrected. Although the code sometimes erroneously thinks that there were not any errors or that any errors were corrected, it frequently knows that there are uncorrected errors in the frame. If the data link code discards or just passes along a frame known to have uncorrected errors, the video decoder might not realize immediately that an error has occurred. Until it does, the decoder will apply updates to the reference frame, generally corrupting the reference frame in the process.

It would be much better for the decoder to receive bits that are obviously wrong so that the decoder knows not to corrupt the reference frame with these erroneous bits. For this reason, when the data link layer knows there are uncorrected errors in the frame, it should replace the frame by a sequence of bits which the video decoder will know are in error. This monitoring of the data link layer could reside in any number of network components located between the endpoints, including, for example, a bridge, gateway, or multi-point control unit (MCU). Because the device discovering the bitstream error may be a network device without a video encoder/decoder, it is preferable that the data link code not be required to know what video encoding standard is being used. It is therefore desirable to have one sequence that works for H.261, H.263, and H.264.

One such sequence is illustrated in FIG. 1. The sequence comprises at least 63 zeros (i.e., 0 repeated more than 62 times), followed by a 1, then 22 zeros, followed by the sequence 10111, followed by ten zeros, followed by a 1. Any remaining bits in the frame should also be ones to avoid "start code emulation." The interpretation of the other bits for each of the compression algorithms is described below.

For H.261 bitstreams, having so many zeros at the beginning ensures that the decoder will detect an error unless it is expecting to encounter a picture or GOB start code. After getting past the first 48 zeros, the decoder will encounter at least 15 more zeros, a one and four zeros, which comprise a Picture Start Code. The next 12 zeros will be taken as the rest of the picture header. (The last bit of PTYPE should be a one, but not all decoders will check that bit because of some codecs long ago that sent the wrong bit.) At this point, the decoder will be expecting to find a GOB Start Code, which is 15 zeros and a one. Instead, it will find only 6 zeros before the one, so the codec will detect another error. The decoder will search for synchronization using the 22 zeros. After skipping the first 7 bits, it will find 15 zeros and a one, which comprise a GOB start code. It will then encounter "0111", indicating a GOB number of seven. After this is the 5-bit GQUANT value. A GQUANT of zero is illegal, so the decoder will detect another error. There are no other strings of zeros in here that are long enough to be mistaken for a picture or GOB start code.

In H.263, having so many zeros at the beginning ensures that the decoder will detect an error unless it is expecting to encounter a picture, GOB, or slice start code. After getting past the first 47 zeros, the decoder will encounter 16 zeros, a one and five zeros, which comprise a Picture Start Code. The ninth bit after this is expected to be a one, but the decoder will encounter a zero, so it will detect an error. The decoder will search for synchronization using the 22 zeros. After skipping the first 6 bits, it will find 16 zeros and a one, which comprise a GOB or slice start code. The next 5 bits, "01110" indicate a GOB number of 14. The next 4 bits will be used for the GOB Sub-bitstream Indicator (GSBI) and GOB Frame ID (GFID). Following them is the 5-bit GQUANT value. A value of zero is illegal, so the decoder will detect another error. There are no other strings of zeros in here that are long enough to be mistaken for a picture, slice or GOB start code.

Finally, using an H.264 decoder, after the first 32 bits, the sequence has 31 zeros and a one, which comprise a sync code. The decoder will detect an error if this sync code does not match the expected alignment. In any case, it will set its alignment expectation according to this sync code. It will then encounter the three bytes 0, 0, 2 (22 zero bits, a one and a zero), which are an illegal sequence. The decoder will not encounter any more sync codes in this bit stream.

In an H.323 video call, each packet contains a sequence number. Using these sequence numbers, it is possible to determine whether any packets have been lost. Because each H.264 NALU fits in one packet and contains sufficient contextual information, it is not necessary to inform the video decoder about missing packets. For H.261 and H.263, it is desirable to replace any missing packet or sequence of packets by an invalid sequence of bits, so the video decoder will not misinterpret the bits in the next packet. Because the packet header indicates what compression algorithm is in use, it is not necessary to use a bit sequence that is invalid for all the algorithms, although it is possible to use such a sequence. It is generally preferred to use a sequence targeted at the compression algorithm in use. Some examples of suitable sequences are described below.

One such invalid sequence suitable for use with H.261 is illustrated in FIG. 2, and comprises sixteen zeros, followed by the sequence 10011, followed by five zeros, and closed with a 1. This will be interpreted as a GOB header with GN=3 and GQUANT=0. Because GQUANT values may not be zero, an error will be detected. The sequence ends with a one to prevent start code emulation through a combination of these bits and any bits following them.

Another such sequence suitable for use with H.263 is illustrated in FIG. 3, and comprises seventeen zeros followed by the sequence 10011, followed by ten zeros and a one. This will be interpreted as a GOB header with GN=6, GSBI=0, GFID=0 and GQUANT=0. Because GQUANT values may not be zero, an error will be detected. The sequence ends with a one to prevent start code emulation through a combination of these bits and any bits following them. Note that this sequence can be used for H.261, also.

The invention has been explained herein with reference to exemplary embodiments. It will be evident to those skilled in the art that various modifications may be made thereto without departing from the broader spirit and scope of the invention. Further, although the invention has been described in the context of its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

What is claimed is:

1. A method performed by a video decoder, the method comprising:

receiving, at the decoder, an encoded video bitstream comprising a plurality of synchronization points;

if an error is detected, designating each macroblock received since a prior synchronization point as a lost macroblock;

re-synchronizing with the encoded bitstream at a synchronization point following the error; and upon decoding of the entire frame, reconstructing each macroblock designated as a lost macroblock; wherein reconstructing each macroblock designated as a lost macroblock comprises:

if the lost macroblock was inter coded with reference to a most recent frame, setting motion vectors of the reconstructed macroblock to the motion vectors of a corresponding macroblock from the most recent frame and setting coefficients of the reconstructed macroblock to zero; and if the lost macroblock was inter coded with reference to a previous frame not the most recent frame or if the lost macroblock was intra coded, setting the reconstructed macroblock to the value of a corresponding macroblock in the previous frame.

2. The method of claim 1 wherein the synchronization points are selected from the group consisting of: frames, groups of blocks, macroblocks, and network adaptation layer units.

3. The method of claim 1 further comprising requesting a full frame intra update for the reconstructed macroblocks.

4. The method of claim 3 wherein a full frame intra update is not requested if intra walk around updates are provided.

5. The method of claim 4 further comprising determining whether intra walk around updates are provided according to the following method:
   recording a timestamp for a lost macroblock when it is marked as lost;
   resetting the timestamp when an intra update for the macroblock is received;
   checking the timestamps for each macroblock at the end of each frame; and
   if a macroblock has been marked as lost for more than a predetermined period, requesting a full frame fast update.

6. A method performed by a video decoder, the method comprising:
   receiving, at the decoder, an encoded video bitstream comprising a plurality of synchronization points;
   if an error is detected, designating each macroblock received since a prior synchronization point as a lost macroblock;
   re-synchronizing with the encoded bitstream at a synchronization point following the error; and
   upon decoding of the entire frame, reconstructing each macroblock designated as a lost macroblock; and
   requesting a full frame intra update for the reconstructed macroblocks unless intra walk around updates are provided wherein a determination whether intra walk around updates are provided is made by:
   recording a timestamp for a lost macroblock when it is marked as lost;
   resetting the timestamp when an intra update for the macroblock is received;
   checking the timestamps for each macroblock at the end of each frame; and
   if a macroblock has been marked as lost for more than a predetermined period, requesting a full frame fast update.

7. A video decoder configured to implement a video decoding method according to claim 1, 3, or 6.

* * * * *